United States Patent
Badzinski et al.

(10) Patent No.: US 10,769,402 B2
(45) Date of Patent: Sep. 8, 2020

(54) NON-CONTACT FRICTION RIDGE CAPTURE DEVICE

(71) Applicant: GEMALTO SA, Meudon (FR)

(72) Inventors: David J. Badzinski, Saint Paul, MN (US); Robert L. Brott, Saint Paul, MN (US); Alexander Domek, Saint Paul, MN (US); Douglas Dunn, Saint Paul, MN (US); Jonathan D. Grandrud, Saint Paul, MN (US); Robert D. Lorentz, Saint Paul, MN (US); Michael A. Meis, Saint Paul, MN (US); Theresa Meyer, Saint Paul, MN (US); Anthony J. Sabelli, Darien, CT (US); Shannon D. Scott, Saint Paul, MN (US); Blake R. Shamla, Saint Paul, MN (US); Robert W. Shannon, Saint Paul, MN (US); John A. Wheatley, Saint Paul, MN (US); Glenn E. Casner, Saint Paul, MN (US); Brett A. Howell, Saint Paul, MN (US)

(73) Assignee: Thales Dis France SA, Meudon (FR)

( * ) Notice: Subject to any disclaimer, the term of this patent is extended or adjusted under 35 U.S.C. 154(b) by 84 days.

(21) Appl. No.: 15/759,132

(22) PCT Filed: Aug. 30, 2016

(86) PCT No.: PCT/US2016/049369
§ 371 (c)(1),
(2) Date: Mar. 9, 2018

(87) PCT Pub. No.: WO2017/044343
PCT Pub. Date: Mar. 16, 2017

(65) Prior Publication Data
US 2018/0268193 A1 Sep. 20, 2018

Related U.S. Application Data (60) Provisional application No. 62/216,056, filed on Sep. 9, 2015, provisional application No. 62/307,799, filed on Mar. 14, 2016.

(51) Int. Cl.
*G06K 9/00* (2006.01)
*G06K 9/20* (2006.01)
*H04N 7/18* (2006.01)

(52) U.S. Cl.
CPC ....... *G06K 9/00033* (2013.01); *G06K 9/2018* (2013.01); *H04N 7/188* (2013.01)

(58) Field of Classification Search
CPC ... G06K 9/00033; G06K 9/2018; H04N 7/188
(Continued)

(56) References Cited

U.S. PATENT DOCUMENTS

| 5,528,355 A * | 6/1996 | Maase | G06K 9/00046 356/71 |
| 7,728,905 B2 * | 6/2010 | Tanaka | G06K 9/00033 348/370 |

(Continued)

FOREIGN PATENT DOCUMENTS

| KR | 20110022923 | * | 2/2011 | G06K 9/00 |
| WO | WO2015123374 A1 | | 8/2015 | |

OTHER PUBLICATIONS

Anonym: "World's Fastest Contactless Fingerprint Scanner to Be Presented at GIS 2014", Aug. 26, 2014, XP055556763, Retrieved from the Internet: URL:https://web.archive.org/web/20150319045332/https://findbiometrics.com/worlds-fastest-contactless-fingerprint-scanner-to-be-presented-at gis-2014/ [retrieved on Feb. 14, 2019] the whole document.

(Continued)

*Primary Examiner* — Jerome Grant, II
(74) *Attorney, Agent, or Firm* — The Jansson Firm; Pehr B. Jansson (57) ABSTRACT

A non-contact friction ridge capture device is described. The device comprises a device housing, the device housing including an electronics compartment and an illumination shield, with an opening between the electronics compartment and the illumination shield into which a user can insert the user's hand. The device further comprising a camera (Continued)

disposed in the electronics compartment for capturing an image of at least one friction ridge surface on a user's hand. The device further comprises a light source disposed in the electronics compartment, the light source emitting light in the direction of the illumination shield, wherein the peak wavelength of emitted light is in the range of 440 to 570 nanometers (nm). The user's hand is not required to contact the device when the camera captures the image of at least one friction ridge surface on a user's hand.

19 Claims, 4 Drawing Sheets

(58) Field of Classification Search
USPC .......................................................... 382/124
See application file for complete search history.

(56) References Cited

U.S. PATENT DOCUMENTS

| | | | |
|---|---|---|---|
| 8,503,122 B2 | 8/2013 | Liu et al. | |
| 2004/0184641 A1* | 9/2004 | Nagasaka | G06K 9/00 382/124 |
| 2005/0047632 A1* | 3/2005 | Miura | G06K 9/00013 382/124 |
| 2008/0256494 A1 | 10/2008 | Greenfield | |
| 2009/0116030 A1* | 5/2009 | Bahuguna | G06K 9/00046 356/457 |
| 2010/0045788 A1 | 2/2010 | Zhang et al. | |
| 2011/0017769 A1* | 1/2011 | Ophardt | A47K 5/1217 222/1 |
| 2011/0085708 A1 | 4/2011 | Martin et al. | |
| 2012/0234858 A1* | 9/2012 | Ophardt | A47K 5/1217 222/52 |
| 2012/0306815 A1* | 12/2012 | Su | G06F 3/042 345/175 |
| 2013/0293454 A1* | 11/2013 | Jeon | G06F 3/017 345/156 |
| 2015/0097936 A1* | 4/2015 | Simske | G06K 9/00033 348/77 |
| 2015/0130917 A1 | 5/2015 | Mil Shtein et al. | |
| 2016/0019673 A1* | 1/2016 | Sakamoto | G06K 9/00013 382/124 |
| 2016/0328597 A1* | 11/2016 | Abiko | G06K 9/3233 |
| 2017/0372049 A1* | 12/2017 | Tieu | G06F 21/36 |
| 2018/0307886 A1* | 10/2018 | Pujara | G06Q 20/40145 |
| 2019/0197218 A1* | 6/2019 | Schwartz | G06K 9/0002 |

OTHER PUBLICATIONS

Ruggero Donida, et al: Touchless Fingerprint Biometrics: A Survey on 2D and 3D Technologies Touchless Fingerprint Biometrics: A Survey on 2D and 3D Technologies, Dec. 31, 2014, XP055556768, DOI: 10.6138/JIT.2014.15.3.01 Retrieved from the Internet: URL:https://pdfs.semanticscholar.org/36bb/75744c01c92113847a5c8c2ae69f4bbd6b63.pdf [retrieved on Feb. 14, 2019] col. 4.

Anonym: "Lumileds power light source Luxeon Emitter", Aug. 21, 2010, XP055556805, Retrieved from the Internet: URL: https://web.archive.org/web/20100821170509/http://sparkfun.com:80/datasheets/Compoents/Luxeon-I.pdf [retrieved on Aug. 10, 2010 the whole document.

PCT/US2016/049369 International Search Report, dated Oct. 17, 2016, P.O. Box 1450, Alexandria, VA 22313-1450.

PCT/US2016/049369 Written Opinion of the International Searching Authority, dated Oct. 17, 2016, P.O. Box 1450, Alexandria, VA 22313-1450.

Anonymous: "Technical Manual", Aug. 17, 2015, XP055684933, Retrieved from the Internet on Apr. 9, 2020: URL: https:www.stemmer-imaging.com/media/uploads/cameras/avt/50/50664_Allied_Vision_Guppy_Technical_Manual_oudZ1Ay.pdf.

Angelo Genovese et al: "Touchless palmprint recognition systems" in: "Touchless palmprint recognition systems", 2014, Springer, XP055695401, ISBN: 978-3-319-10364-8, DOI: DOI 10.1007/978-3-319-10365.5.

D. Zhang et al: "Palmprint Recognition Using 3-D Information", IEEE Transactions on Systems, Man, and Cybernetics: Part C: Applications and Reviews., vol. 39, No. 5, Sep. 2009, pp. 505-519, XP055688813, US, ISSN: 1094-6977, DOI: 10.1109/TSMCC.2009.2020790.

\* cited by examiner

NON-CONTACT FRICTION RIDGE CAPTURE DEVICE

TECHNICAL FIELD

The present invention relates to the field of capturing biometric data, specifically friction ridge information, such as fingerprints and palm prints. More specifically, the present invention describes a contactless friction ridge capture device.

BACKGROUND

Fingerprints, palm prints, and other biometric data, in particular, friction ridge data or images are used by many government, commercial, residential or industrial entities for a variety of purposes. These purposes include, merely by way of illustration, identifying individuals at border locations, confirming identity for purposes of access control or authentication, and forensic investigations using biometric data left at the scene of a crime.

Each of these uses of friction ridge data or images requires capturing such data from an individual. These uses also often include storing such data in a database so that a comparison can be made between a newly captured sample and an existing sample in the database.

Currently, fingerprints are captured for inclusion in such a database in a variety of ways. Traditional fingerprint capture methods include capture of a fingerprint based on contact of the finger with paper or a platen surface. A paper based method includes pressing an individual's finger against an ink source and then pressing and rolling the finger onto a piece of paper. A platen method includes pressing or rolling a finger against a hard surface (e.g., glass, silicon, or polymer) and capturing an image of the print with a sensor. Both paper and platen fingerprint capture methods have higher than preferable occurrence of partial or degraded images due to factors such as improper finger placement, skin deformation, slippage and smearing or sensor noise from wear and tear on surface coatings, or too moist or too dry skin. Such fingerprint capture methods also have challenges with respect to hygiene and contamination between multiple individuals placing their fingers or hands in a common ink pad or on a common surface.

While various touchless fingerprint capture methods have been proposed, these also face challenges of acquiring a high quality and accurate image, due to reduced control around actual placement of a finger, hand or palm with respect to an image capture device. An improved method for friction ridge capture would be welcome.

SUMMARY

The present disclosure provides improvements over existing friction ridge capture methods and devices. For example, the present disclosure does not require a subject to physically touch a platen or other surface in order to capture the friction ridge surface, thus providing an improvement in hygiene. Further, the present disclosure provides a faster method of capturing fingerprints as it does not require application of ink or contact with a particular surface. Border control applications would benefit from the improved speed and the reduced chance of spreading contagion. Corrections applications, which deal with non-compliant subjects, would benefit from improved speed and reduced risk of smudging. The present disclosure further provides an improved device for accurately capturing images of friction ridge surfaces and separating such surface from a background.

The present disclosure provides a non-contact friction ridge capture device. The device includes a device housing, the device housing including an electronics compartment and an illumination shield, with an opening between the electronics compartment and the illumination shield into which a user can insert the user's hand. The device further includes a camera disposed in the electronics compartment for capturing an image of at least one friction ridge surface on a user's hand. The device includes a light source disposed in the electronics compartment, the light source emitting light in the direction of the illumination shield, wherein the peak wavelength of emitted light is in the range of 410 to 540 nanometers (nm). The user's hand is not required to contact the device when the camera captures the image of at least one friction ridge surface on a user's hand.

In some instances, wherein the peak wavelength of the emitted light is in the range of 460 to 470 nm.

In some instances, wherein the friction ridge surface is a finger pad or a thumb pad.

In some instances, wherein the friction ridge surface is a palm.

In some instances, the device further includes a light guide to direct the emitted light toward the opening in a uniform manner.

In some instances, the light source comprises at least one light emitting diode (LED).

In some instances, the device further includes infrared sensor, wherein when the infrared sensor detects the presence of a hand in the opening, the infrared sensor triggers the light source and the camera.

In some instances, when the light source is triggered, the infrared sensor is deactivated.

In some instances, when the camera is triggered, the camera captures more than one image of the friction ridge surface.

In some instances, the camera comprises an imaging sensor and a lens.

In some instances, the device further comprises a transparent surface disposed between the electronics compartment and the opening.

In some instances, the device further comprises a surface disposed between the electronics compartment and the opening, wherein the surface includes a multi-layer optical film (MOF), wherein the MOF filters out light outside a selected frequency range.

In some instances, the device further comprises a second camera, wherein the first camera is positioned to capture an image of the finger pads on a user's hand, and wherein the second camera is positioned to capture an image of the thumb pad on a user's hand.

In some instances, the device further comprises a communications module, wherein the communications module communicates with an exterior processor.

In some instances, the exterior processor triggers the light source and the camera.

BRIEF DESCRIPTION OF THE DRAWINGS

The following figures provide illustrations of the present invention. They are intended to further describe and clarify the invention, but not to limit the scope of the invention.

Like numbers are generally used to refer to like components. The drawings are not to scale and are for illustrative purposes only.

DETAILED DESCRIPTION

Figure 1A:
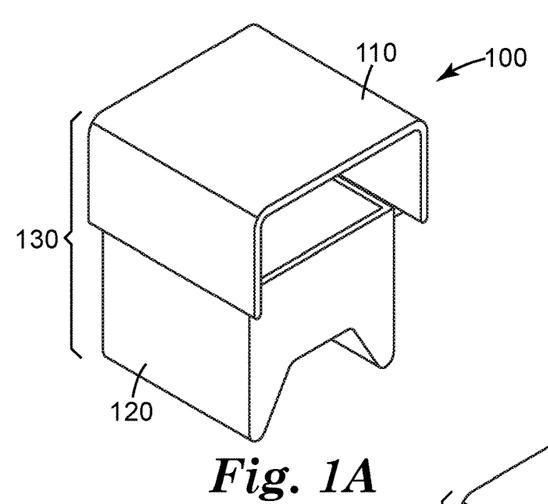
FIGS. 1a and 1b show a non-contact friction ridge capture device without and with a user's hand in the opening, respectively.
Figure 1B:
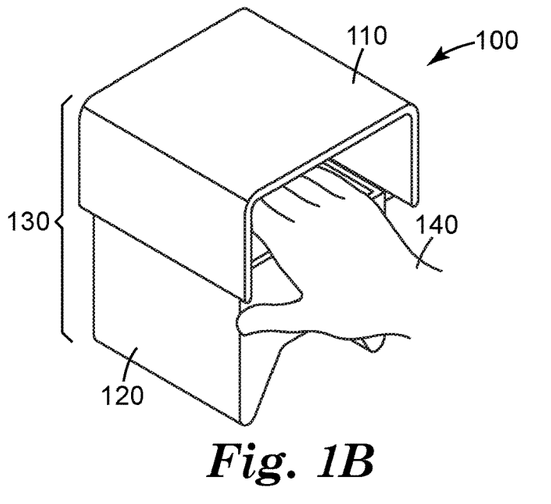

FIGS. 1a and 1b show a non-contact friction ridge capture device 100 without and with a user's hand in the opening, respectively. The friction ridge capture device 100 enables capture of a user's fingerprints or other friction ridge surfaces for use in identity and verification. A friction ridge surface is any area of skin having durable morphological features or minutiae, including unique ridges, creases, scars and pores. Friction ridge surfaces are most commonly present on a person's hands or feet, and in particular, on phalange, on the sole of a person's feet or toes, on palmar surfaces of a hand, including the palm, fingers, the area between two joints on a finger, the area between two fingers, and fingertips. Minutiae can include, for example:

Ridge ending: the abrupt end of a ridge;
Ridge bifurcation: a single ridge that divides into two ridges;
Short or Independent ridge: a ridge that commences, travels a short distance, and then ends;
Island: a single small ridge inside a short ridge or ridge ending that is not connected to all other ridges;
Ridge enclosure: a single ridge that bifurcates and reunites shortly afterward to continue as a single ridge;
Spur: a bifurcation with a short ridge branching off a longer ridge;
Crossover or Bridge: a short ridge that runs between two parallel ridges;
Delta: a Y-shaped ridge meeting; and
Core: a U-turn in the ridge pattern.

Device 100 includes device housing 130. Device housing includes illumination shield 110, and electronics compartment 120, with opening 150 between illumination shield 110 and electronics compartment 120 into which a user can insert the user's hand 140. FIG. 1a shows the device 100 itself, without a user's hand inserted into opening 150. FIG. 1b shows the device 100 with a user's hand inserted into opening 150. Throughout this disclosure, user's hand refers to any portion of a user's hand, such as a single finger, more than one finger, a thumb, all five digits, a palm, or an entire hand. In some instances, opening 150 may be configured for a user to insert a foot into opening 150. In some instances, opening 150 may be configured for a user to insert a hand or a foot into opening 150. Throughout this disclosure a user's foot refers to any portion of a user's foot, such as a single toe, more than one toe, the plantar portion of a user's foot or the entire foot.

In this illustrated embodiment, opening 150 is sized such that a user can insert their entire hand or foot into opening 150 without contacting device 100 or touching any portion of illumination shield 110 or electronics compartment 120. In this illustrated embodiment, opening 150 is bounded on five of six sides by device housing 130, and specifically by the combination of illumination shield 110 and electronics compartment 120. In some instances, opening 150 may be bounded on four sides. In some instances, opening 150 may be bounded by as few as three sides or two sides.

Illumination shield 110 bounds at least one side of opening 150. Illumination shield has multiple benefits. For example, illumination shield 110 protects the interior components of device 100. Further illumination shield 110 shields the camera of device 100 (not shown) from ambient light. Illumination shield 110 encloses or provides a background for the image of user's hand 140, allowing a sharper contrast between user's hand 140 and an image background. Illumination shield 110 can also help to reduce "ghosting" effects caused by movement of the user's hand while an image of a friction ridge surface is being captured. The illumination shield 110 also provides a limit on the distance that a user can place their hand 140 from the camera included in electronics compartment 120, keeping the hand within the focus range of the camera.

Figure 1C:
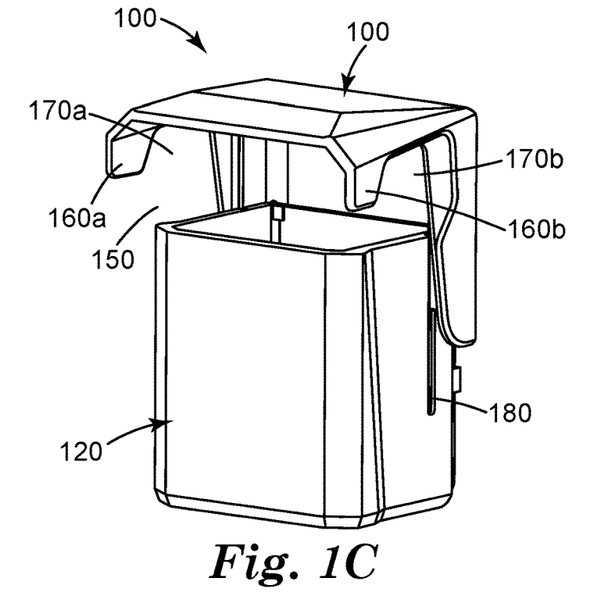
FIG. 1c shows a non-contact friction ridge capture device with modified illumination shield to aid user interaction and operation.

Illumination shield 110 may completely cover one or more sides of the electronics component 120 and permit access only through the opening in the front of the device as represented in FIG. 1a or 1b. In another configuration, illumination shield 110 may be modified to enhance user interaction and operation. FIG. 1c shows another configuration that molds tapered wings 160a, 160b (collectively 160) on each side of the illumination shield 110 relative or toward the opening 150. The tapered wings 160 of the illumination shield 110 may provide visual indication as to where a user would place their hand in the opening 150 to improve capture of friction ridges. Text or other graphics (e.g., arrows, symbols, etc.) may be printed on the illumination shield 110 or tapered wings 160 to provide further guidance. Other edges of the illumination shield 110 may be tapered to also provide visual cues or guidance to a user. One or more gaps 170a, 170b may be patterned in the illumination shield 110 for individual insertion of a specific finger, toe, or thumb. FIG. 1c shows gaps 170a, 170b on each side of the illumination shield 110, which would enable a user to insert a finger or thumb on both sides whereby permitting simultaneous capture of the two fingers or thumbs. In some configurations of FIG. 1c, the gaps 170 would only be visible when the illumination shield 110 is raised up from the electronics component 120. This improves user interaction while the device is used and still permits the illumination shield to protect the device when not in use (i.e., closed).

Illumination shield 110 can be secured to electronics compartment 120 or other portions of housing 130 in a variety of ways. In one configuration, illumination shield 110 attaches to electronics compartment 120 using fitted grooves and two bolts. In other configurations, illumination shield 110 may be manufactured as an integral part with electronics compartment 120. In other configurations, illumination shield 110 may be mounted to the electronics compartment 120 using one or more tracks 180. The illumination shield 110 may move or slide up to open or down to close the device. Illumination shield 110 may be ultrasonically welded, adhered, or otherwise secured to electronics compartment 120 as will be apparent to one of skill in the art upon reading the present disclosure.

Illumination shield 110 may be a variety of materials, such as metal, glass, plastic, resin, polyurethane or any light absorbing material. Illumination shield may include any of these materials in combination with a light absorbing material to reduce specularity or reflection. In some instances, illumination shield is black, opaque or shields or absorbs light.

Electronics compartment 120 serves to shield electronics components in device 100 from exposure to exterior elements and environmental factors and to provide a structure for mounting electronic components included in device, such as a camera, light source, infrared sensor, and other components discussed throughout the present disclosure. Electronics compartment 120 also provides a boundary for opening 150. In some instances, a transparent surface, such as glass or a type of plastic or film may be disposed between electronics compartment 120 and opening 150. Such a surface provides additional protection for electronic components in electronics compartment 120 without creating a visual barrier between a camera in electronics compartment 120 and opening 150. In some instances, a surface between electronics compartment 120 and opening 150 may include a multi-layer optical film (MOF) or other material that serves to filter frequencies of light. The MOF or other filter may filter or block all light outside of a selected frequency range. For example, in one instance, a selected frequency range may be in the blue or green light spectrum, range of 440 to 570 nanometers (nm). In another instance, a selected frequency may be 460 to 480 nm.

Device 100 may include other elements, such as a power cord to enable the device 100 to be plugged into a wall outlet. Device 100 may include other ports to allow connection to an internet, Ethernet or other network to allow device 100 to transfer captured images to other devices, be controlled by other devices and otherwise communicate with other devices. Other variations on the housing and components of device 100 that are within the scope of the present disclosure will be apparent to one of skill in the art upon reading the present disclosure.

Figure 2:
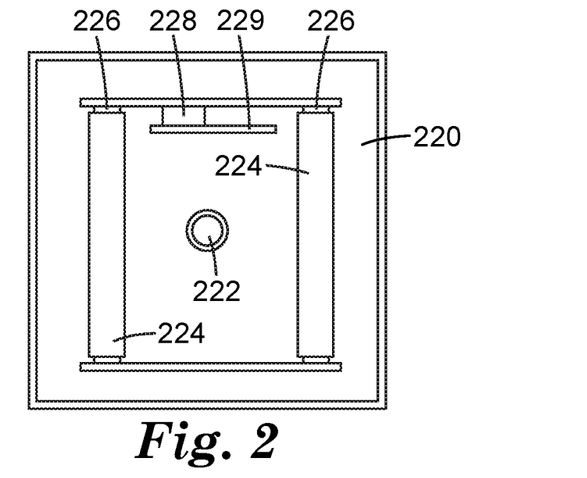
FIG. 2 shows the electronics compartment of a friction ridge capture device.

FIG. 2 shows the electronics compartment 220 of a friction ridge capture device. Electronics compartment 220 as shown in FIG. 2 is an exemplary arrangement of various electronic components that may be included in a friction ridge capture device. Other components may be used in various combinations, as will be apparent upon reading the present disclosure. Electronics compartment 220 includes camera 222. Camera 222 may include a lens and an image or optical sensor. In the illustrated embodiment, camera 222 may be a high-resolution camera for a desired field of view. Other factors for selecting camera 222 may include the particular lens and imaging sensor included in camera 222, the sensitivity of the camera to particular wavelengths of light, and the size and cost of the camera.

Electronics compartment 220 further includes light sources 226. In the illustrated embodiment, light sources are light emitting diodes (LED's) that emit light peaking in the blue wavelength. For example, the peak wavelength of emitted light may be in the range of 440 to 570 nanometers (nm). More specifically, the peak wavelength of emitted light may be in the range of 460 to 480 nm. Human skin has been found to have higher reflectivity in the green and blue portions of the visible light spectrum, thus emitting light with wavelengths peaking in the blue and green portions of the visible light spectrum can help to more clearly illuminate details on a friction ridge surface of a user's hand. Light sources 226 may be paired with passive or active heatsinks to dissipate heat generated by light sources 226. In this instances, light sources are illuminated for a relatively short period of time, for example, ten (10) milliseconds or less, and as such, a passive heatsink is adequate for thermal dissipation. In other instances, where light sources 226 that generate more heat are used, or where light sources 226 are illuminated for a longer periods of time, one of skill in the art may choose a different type of heatsink, such as an active heatsink.

Camera 222 may be chosen in part based on its response to light in a chosen wavelength. For example, in one instance, the device described herein uses a five megapixel (5 MP) camera because of its optimal response in the blue wavelength. In other configurations of the present disclosure, other wavelengths of light may be emitted by light sources 226, and other types of cameras 222 may be used.

Light emitted by light sources 226 may be of varying power levels. Light sources 226 may be, in some instances, paired with light guides 224 to direct the output of light sources 226 to direct the emitted light toward the opening in a uniform manner. In one instances, light guides are made of a polycarbonate tube lined with enhanced specular reflector (ESR) film and a turning film. In some instances, light guides 224 may collimate the emitted light. The collimation of light aligns the rays so that each is parallel, reducing light scattering and undesired reflections. In other instances, light guides 224 may direct the output of light sources 226 toward the opening such that the rays of light are generally parallel. A light guide 224 may be any applicable configuration, and will be apparent to one of skill in the art upon reading the present disclosure. Further, electronics compartment 222 may include a single light guide 224, multiple light guides 224 or no light guides at all.

Infrared (IR) sensor 228 includes both an infrared emitter that emits infrared light into opening 150 and a sensor component that detects reflections of the emitted infrared light. IR sensor 228 can be used to determine whether an object of interest, such as a hand, has entered the field of view of the camera 222. The device described herein may include a single or multiple IR sensors 228.

Controller 229 may be a microcontroller or other processor used to control various elements of electronics within electronics compartment 220, such as IR sensor 228, light sources 226, and camera 222. Controller 229 may also control other components not pictured in FIG. 2, including other microcontrollers. Other purposes of controller 229 will be apparent to one of skill in the art upon reading the present disclosure.

Figure 3:
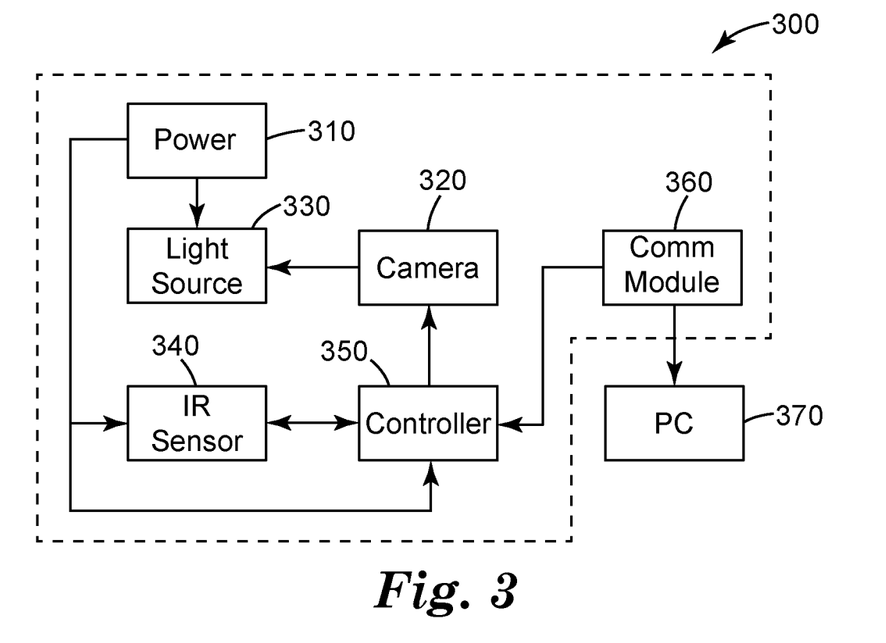
FIG. 3 is a block diagram of a non-contact friction ridge capture device.

FIG. 3 is a block diagram of a non-contact friction ridge capture device 300. Device 300 includes power source 310. Power source 310 may be an external power source, such as a connection to a building outlet, or may be an internal stored power source 310, such as a battery. In one instance, power source 310 is a 12V, 5 A power supply. Power source 310 may be chosen to be a limited power source to limit the exposure or voltage or current to a user in the case of electrical fault. Power source 310 provides power, through voltage regulators, to light source 330, camera 320, IR sensor 340, controller 350 and communications module 360.

Infrared sensor 340 is powered by power source 310 and controlled by controller 350. In some instances, IR sensor 340 may be activated by controller 350. When IR sensor 340 is first activated by controller 350, it is calibrated, as discussed in further detail herein. After calibration, when an object enters the field of view of the IR sensor 340, it generates an increased signal from the sensor, and if the increased signal exceeds a predetermined threshold, controller 350 triggers light source 330 and camera 320. An example of an object entering the field of view of IR sensor is a finger, thumb or hand of a user.

Controller 350 is used for a variety of purposes, including acquiring and processing data from IR sensors 340, synchronizing light source 330 flashes and camera 320 exposure timings, and toggling IR sensors 340 during different stages of image acquisition. Controller 350 can interface with communications module 360 which is used to communicate with external devices, such as an external personal computer (PC), a network, or other electronic device. Communications module may communicate with external devices in a variety of ways, including using wifi, Bluetooth, radio frequency communication or any other communication protocol as will be apparent to one of skill in the art upon reading the present disclosure.

Upon power up of the friction ridge capture device, controller 350 runs a calibration routine on the IR sensors 340 to account for changes in the IR system output and ambient IR. After calibration, the microcontroller enters the default triggering mode, which uses the IR sensors. In the default triggering mode, the camera 320 and light source 330 are triggered in response to IR sensor 340 detecting an object in its field of vision. When using IR sensor triggering, the microcontroller acquires data from the sensors, filters the data, and if a threshold is reached, acquires an image of a friction ridge surface in the opening of the device.

In a second triggering mode, the camera 320 and light source 330 may be triggered based on commands sent from an internal device, such as a PC or other electronic device, and received by the communication module 360, and sent to controller 350. In the second triggering mode, the device then acquires an image, and the image may be processed and displayed on a user interface in the PC or other external device.

During the process of image capture, when light source 330 is emitting light and/or when camera 320 is capturing an image, the microcontroller disables the IR sensors 340. The IR sensors 340 are disabled to prevent extraneous IR light from hitting the camera 320. The IR sensors are disabled for the duration of the image acquisition process. After the IR sensors are disabled, the light source 330 activated and the camera 320 is triggered. In some instances, the light source 330 is activated for the duration of image acquisition. After camera exposure completes, the IR sensors 340 are activated and the light source 330 is deactivated.

The output of the friction ridge capture device may vary, depending on the lighting and camera choices. In one instance, the output of the friction ridge capture device may be a grayscale image of the friction ridge surface. In some instances, when the camera captures the image of at least one friction ridge surface on a user's hand, the image is a picture of the user's fingers, or a finger photo. The image may then be processed by controller 350 or by an external processor to create a processed fingerprint image where the background behind the hand or fingers is removed and the friction ridges or minutiae are emphasized.

In some instances, the camera 320 may be configured to optimally photograph or capture an image of a user's hand. For example, in some cases the camera may use an electronic rolling shutter (ERS) or a global reset release shutter (GRRS). GRRS and ERS differ in terms of when the pixels become active for image capture. GRRS starts exposure for all rows of pixels at the same time, however, each row's total exposure time is longer than the exposure time of the previous row. ERS exposes each row of pixels for the same duration, but each row begins that row's exposure after the previous row has started. In some instances, the present disclosure may use GRRS instead of ERS, in order to eliminate the effects of image shearing. Image shearing is an image distortion caused by non-simultaneous exposure of adjacent rows (e.g. causing a vertical line to appear slanted). Hand tremors produce motion that can lead to image shearing. Therefore, GRRS can be used to compensate for hand tremors and other movement artifacts. To counteract the blurring may occur with GRRS, the illumination shield reduces the effects of ambient light.

Figure 4:
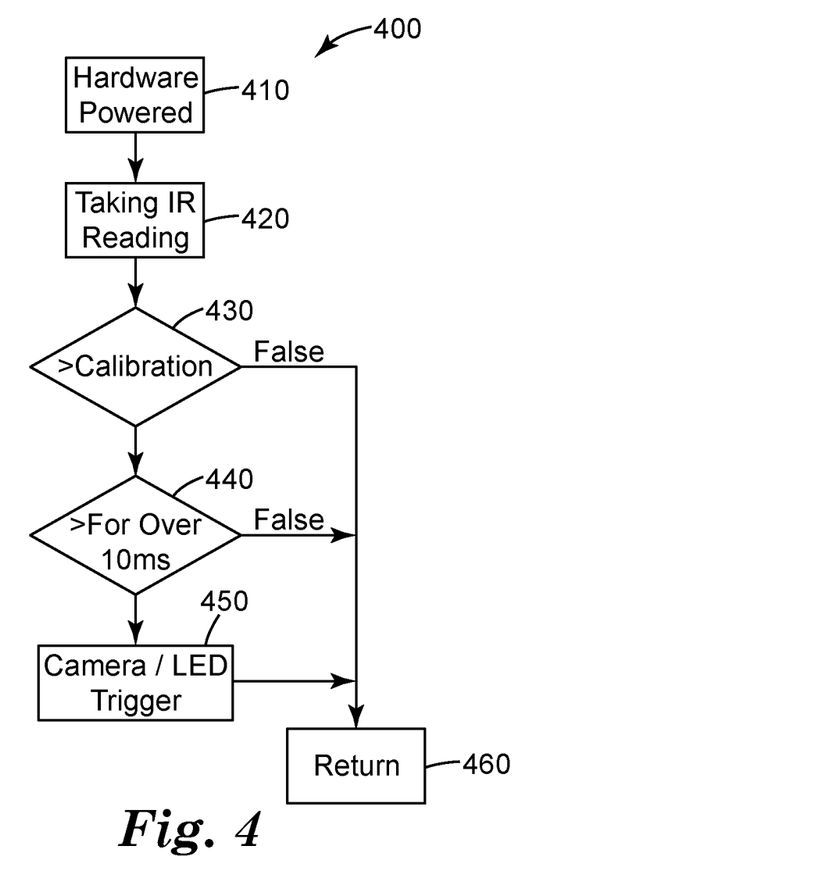
FIG. 4 is a flow chart for triggering the camera and light source of a non-contact friction ridge capture device.

FIG. 4 is a flow chart 400 for triggering the camera and light source of a non-contact friction ridge capture device. In step 410, the device hardware is powered. The device may be powered by a user flipping a switch or otherwise interacting with a user interface or input option with the device. The device may alternately or also be powered through a command from an external device, such as a PC, in communication with the device.

After the device is powered, in step 420, the IR sensors take an initial IR reading.

In step 430, the IR sensors are calibrated by measuring the unobstructed view from the sensors to the illumination shield and creating an averaged baseline. If calibration is not completed, or is "false", the device returns to step 420. To prevent the baseline from losing accuracy, the baseline is updated at a regular interval to compensate for thermal drift and changing ambient conditions.

Once calibration in step 430 is completed, the device takes further IR readings at regular intervals to detect deviation from the calibrated baseline in step 440. If the IR readings indicate an increased IR reading for a period of time over 10 milliseconds, the camera and light source are triggered. If the increased IR reading lasts for less than 10 milliseconds, the device returns to step 420.

In step 450, the camera and light source are triggered to capture an image of the user's hand. After the image is captured, the device returns to step 420.

Flow chart 400 shows an exemplary method for triggering the camera and light source using IR sensors. Other methods for triggering the camera and light source will be apparent to one of skill in the art upon reading the present disclosure, for example, manually triggering the camera and light source, or using other sensors, such as a motion sensor or ultrasonic sensor to trigger the camera and light source.

Figure 5A:
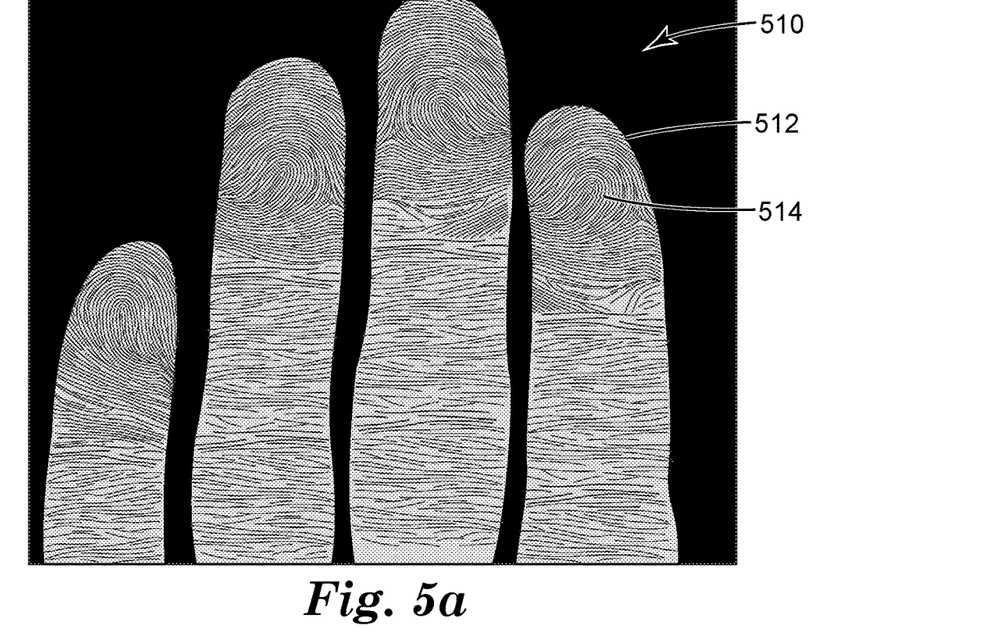
FIGS. 5a and 5b show captured images of a friction ridge surface before and after processing, respectively.
Figure 5B:
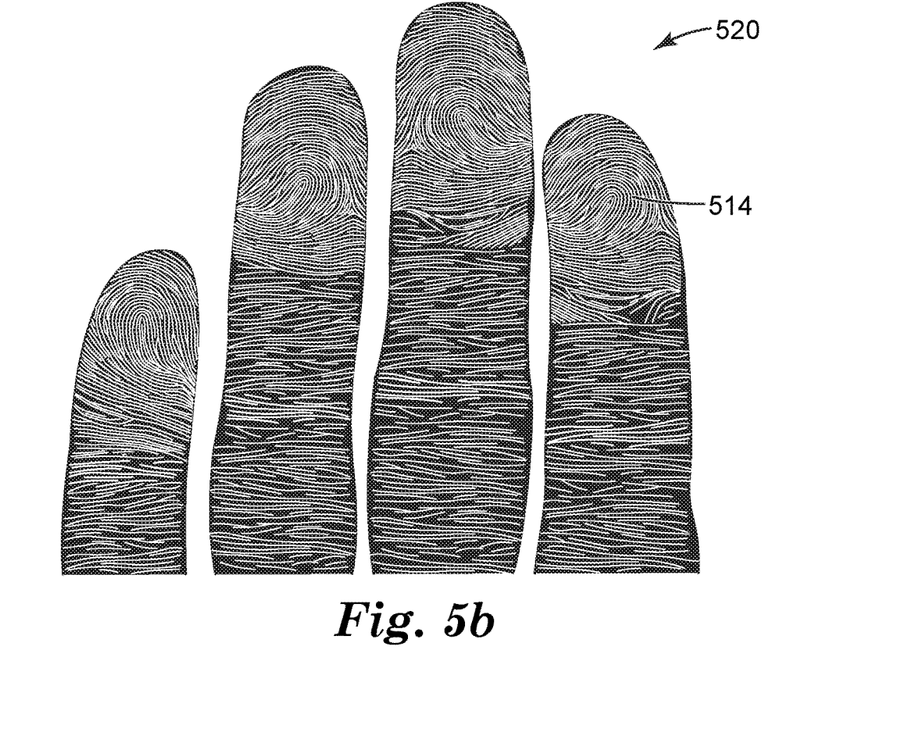

FIGS. 5a and 5b show captured images of a friction ridge surface before and after processing, respectively. FIG. 5a is a finger photo 510. It is an unprocessed image of at least one friction ridge surface on a user's hand as captured by camera of the non-contact friction ridge surface capture device. FIG. 5a includes friction ridge surfaces, in this instance, fingers 512. Background 514 is formed by the background of the illumination shield behind the user's hand.

In some instances, the non-contact friction ridge capture device may also process the image, such as the one shown in FIG. 5a, to generate output shown in FIG. 5b. FIG. 5b shows a processed fingerprint image 520. In processed fingerprint image 520, the background has been removed from friction ridge surfaces. The friction ridge surfaces 525 have undergone image processing to highlight friction ridges and minutiae. In some instances, this processing may be completed locally by a controller in the non-contact friction ridge capture device. In some other instances, this additional processing may be completed by a device or processor external to the non-contact friction ridge capture device. Both types of images as shown in FIGS. 5a and 5b may be stored as part of a record in a database, and both may be used for purposes of identification or authentication.

Although the methods and systems of the present disclosure have been described with reference to specific exemplary embodiments, those of ordinary skill in the art will readily appreciate that changes and modifications may be made thereto without departing from the spirit and scope of the present disclosure.

In the present detailed description of the preferred embodiments, reference is made to the accompanying drawings, which illustrate specific embodiments in which the invention may be practiced. The illustrated embodiments are not intended to be exhaustive of all embodiments according to the invention. It is to be understood that other embodiments may be utilized and structural or logical changes may be made without departing from the scope of the present invention. The following detailed description, therefore, is not to be taken in a limiting sense, and the scope of the present invention is defined by the appended claims.

Unless otherwise indicated, all numbers expressing feature sizes, amounts, and physical properties used in the specification and claims are to be understood as being modified in all instances by the term "about." Accordingly, unless indicated to the contrary, the numerical parameters set forth in the foregoing specification and attached claims are approximations that can vary depending upon the desired properties sought to be obtained by those skilled in the art utilizing the teachings disclosed herein.

As used in this specification and the appended claims, the singular forms "a," "an," and "the" encompass embodiments having plural referents, unless the content clearly dictates otherwise. As used in this specification and the appended claims, the term "or" is generally employed in its sense including "and/or" unless the content clearly dictates otherwise.

Spatially related terms, including but not limited to, "proximate," "distal," "lower," "upper," "beneath," "below," "above," and "on top," if used herein, are utilized for ease of description to describe spatial relationships of an element(s) to another. Such spatially related terms encompass different orientations of the device in use or operation in addition to the particular orientations depicted in the figures and described herein. For example, if an object depicted in the figures is turned over or flipped over, portions previously described as below or beneath other elements would then be above or on top of those other elements.

As used herein, when an element, component, or layer for example is described as forming a "coincident interface" with, or being "on," "connected to," "coupled with," "stacked on" or "in contact with" another element, component, or layer, it can be directly on, directly connected to, directly coupled with, directly stacked on, in direct contact with, or intervening elements, components or layers may be on, connected, coupled or in contact with the particular element, component, or layer, for example. When an element, component, or layer for example is referred to as being "directly on," "directly connected to," "directly coupled with," or "directly in contact with" another element, there are no intervening elements, components or layers for example. The techniques of this disclosure may be implemented in a wide variety of computer devices, such as servers, laptop computers, desktop computers, notebook computers, tablet computers, hand-held computers, smart phones, and the like. Any components, modules or units have been described to emphasize functional aspects and do not necessarily require realization by different hardware units. The techniques described herein may also be implemented in hardware, software, firmware, or any combination thereof. Any features described as modules, units or components may be implemented together in an integrated logic device or separately as discrete but interoperable logic devices. In some cases, various features may be implemented as an integrated circuit device, such as an integrated circuit chip or chipset. Additionally, although a number of distinct modules have been described throughout this description, many of which perform unique functions, all the functions of all of the modules may be combined into a single module, or even split into further additional modules. The modules described herein are only exemplary and have been described as such for better ease of understanding.

If implemented in software, the techniques may be realized at least in part by a computer-readable medium comprising instructions that, when executed in a processor, performs one or more of the methods described above. The computer-readable medium may comprise a tangible computer-readable storage medium and may form part of a computer program product, which may include packaging materials. The computer-readable storage medium may comprise random access memory (RAM) such as synchronous dynamic random access memory (SDRAM), read-only memory (ROM), non-volatile random access memory (NVRAM), electrically erasable programmable read-only memory (EEPROM), FLASH memory, magnetic or optical data storage media, and the like. The computer-readable storage medium may also comprise a non-volatile storage device, such as a hard-disk, magnetic tape, a compact disk (CD), digital versatile disk (DVD), Blu-ray disk, holographic data storage media, or other non-volatile storage device.

The term "processor," or "controller" as used herein may refer to any of the foregoing structure or any other structure suitable for implementation of the techniques described herein. In addition, in some aspects, the functionality described herein may be provided within dedicated software modules or hardware modules configured for performing the techniques of this disclosure. Even if implemented in software, the techniques may use hardware such as a processor to execute the software, and a memory to store the software. In any such cases, the computers described herein may define a specific machine that is capable of executing the specific functions described herein. Also, the techniques could be fully implemented in one or more circuits or logic elements, which could also be considered a processor.

What is claimed is:

1. A non-contact friction ridge capture device comprising:
 a device housing, the device housing including an electronics compartment having an open side onto which a user can present the user's hand;
 the device further comprising a camera disposed in the electronics compartment for capturing an image of at least one friction ridge surface on the user's hand, wherein the camera comprises a global reset release shutter (GRRS) for capturing the image;
 a light source disposed in the electronics compartment, the light source emitting light in the direction of the open side, wherein the peak wavelength of emitted light is in the range of 440 to 570 nanometers (nm); and
 a light guide comprising a polycarbonate tube lined with an enhanced specular reflector (ESR) film to direct the emitted light toward the open side in a uniform manner;
 wherein the user's hand is not required to contact the device when the camera captures the image of at least one friction ridge surface on a user's hand;
 wherein the device housing further comprises an illumination shield connected to the electronics compartment such as to provide an opening between the illumination shield configured such that the user's hand can be inserted between the illumination shield and the electronics compartment, the illumination shield including a light absorbing material and reduces blurring that may occur in an image captured using the global reset release shutter due to the effects of ambient light.

2. The device of claim 1, wherein at least one edge of the illumination shield is tapered relative to the opening.

3. The device of claim 1, wherein at least one gap is patterned into the illumination shield.

4. The device of claim 1, wherein the peak wavelength of the emitted light is in the range of 460 to 480 nm.

5. The device of claim 1, wherein the friction ridge surface is a finger pad or a thumb pad.

6. The device of claim 1, wherein the friction ridge surface is a palm.

7. The device of claim 1, wherein the light source comprises at least one light emitting diode (LED).

8. The device of claim 1, further comprising an infrared sensor, wherein when the infrared sensor detects the presence of a hand in the opening, the infrared sensor triggers the light source and the camera.

9. The device of claim 8, wherein when the light source is triggered, the infrared sensor is deactivated.

10. The device of claim 8, wherein when the camera is triggered, the camera captures more than one image of the friction ridge surface.

11. The device of claim 1, wherein the camera comprises an imaging sensor and a lens.

12. The device of claim 1, further comprising a transparent surface disposed between the electronics compartment and the opening.

13. The device of claim 1, further comprising a surface disposed between the electronics compartment and the opening, wherein the surface includes a multi-layer optical film (MOF), wherein the MOF filters out light outside a selected frequency range.

14. The device of claim 1, further comprising a second camera, wherein the first camera is positioned to capture an image of the finger pads on a user's hand, and wherein the second camera is positioned to capture an image of the thumb pad on a user's hand.

15. The device of claim 1, further comprising a communications module, wherein the communications module communicates with an exterior processor.

16. The device of claim 1, wherein the exterior processor triggers the light source and the camera.

17. The device of claim 1, wherein the polycarbonate tube of the light guide further is lined with a turning film.

18. The device of claim 1, wherein the light guide is located adjacent to the light source and collimate the emitted light.

19. The device of claim 1, wherein the light guide is located adjacent to the light source and direct the emitted light in parallel rays toward the open side.

* * * * *